(12) United States Patent
Toksoz et al.

(10) Patent No.: US 11,710,224 B2
(45) Date of Patent: Jul. 25, 2023

(54) IMAGE PROCESSING SYSTEM FOR VERIFICATION OF RENDERED DATA

(71) Applicant: GOOGLE LLC, Mountain View, CA (US)

(72) Inventors: Tuna Toksoz, Mountain View, CA (US); Anton Kast, San Francisco, CA (US)

(73) Assignee: Google LLC, Mountain View, CA (US)

( * ) Notice: Subject to any disclaimer, the term of this patent is extended or adjusted under 35 U.S.C. 154(b) by 1060 days.

(21) Appl. No.: 16/330,685

(22) PCT Filed: Oct. 31, 2017

(86) PCT No.: PCT/US2017/059369
§ 371 (c)(1),
(2) Date: Mar. 5, 2019

(87) PCT Pub. No.: WO2019/089012
PCT Pub. Date: May 9, 2019

(65) Prior Publication Data
US 2021/0342995 A1 Nov. 4, 2021

(51) Int. Cl.
G06T 7/00 (2017.01)
G06T 5/00 (2006.01)
H04L 67/01 (2022.01)

(52) U.S. Cl.
CPC ............ G06T 7/0002 (2013.01); G06T 5/006 (2013.01); H04L 67/01 (2022.05); G06T 2200/16 (2013.01); G06T 2207/30176 (2013.01)

(58) Field of Classification Search
CPC ... G06Q 10/107; H04L 51/00; H04L 63/0428; H04L 63/0823; H04L 63/12;
(Continued)

(56) References Cited

U.S. PATENT DOCUMENTS 8,583,482 B2 * 11/2013 Netzer ................. G06Q 30/018
705/14.43
2002/0165912 A1 * 11/2002 Wenocur ................. H04L 65/80
709/203
(Continued)

FOREIGN PATENT DOCUMENTS

CN 201674570 12/2010
CN 102084388 6/2011
(Continued)

OTHER PUBLICATIONS

PCT International Preliminary Report on Patentability in International Application No. PCT/US2017/059369, dated May 5, 2020, 8 pages.
(Continued)

Primary Examiner — Ming Wu
(74) Attorney, Agent, or Firm — Fish & Richardson P.C.

(57) ABSTRACT

An image processing system for verifying that embedded digital content satisfies a predetermined criterion associated with display of the content, the image processing system a content embedding engine that embeds content in a resource provided by a content provider and that configures the resource for rendering, a rendering engine that renders the content embedded in the resource; an application interface engine that interfaces with the rendering engine and that generates a visualization of the resource and of the embedded content rendered in the resource; and an image processing engine that processes one or more pixels of the generated visualization of the resource and of the embedded content and the resource to verify that the specified visual element satisfies the predetermined criterion; and transmits verification data comprising an indication of whether the predetermined criterion is satisfied.

16 Claims, 8 Drawing Sheets

(58) Field of Classification Search
CPC ....... H04L 63/126; H04L 65/80; H04L 67/26; H04L 67/306; H04L 69/329
See application file for complete search history.

(56) References Cited

U.S. PATENT DOCUMENTS

| | | | |
|---|---|---|---|
| 2003/0182475 A1 | 9/2003 | Gimenez | |
| 2009/0031216 A1 | 1/2009 | Dressel et al. | |
| 2010/0017217 A1* | 1/2010 | Olliphant | G06Q 20/04 715/209 |
| 2011/0173071 A1 | 7/2011 | Meyer et al. | |
| 2013/0091463 A1* | 4/2013 | Nordstrom | G06Q 30/02 715/810 |
| 2016/0065571 A1* | 3/2016 | Hoyos | H04L 63/0428 713/168 |
| 2016/0196134 A1* | 7/2016 | Holtmanns | H04L 63/0428 717/172 |
| 2016/0283050 A1 | 9/2016 | Tomaszewski et al. | |
| 2017/0103305 A1* | 4/2017 | Henry | G06F 7/483 |

FOREIGN PATENT DOCUMENTS

| | | |
|---|---|---|
| CN | 104484587 A | 4/2015 |
| CN | 104718770 | 6/2015 |
| CN | 106487870 | 3/2017 |
| CN | 107005746 | 8/2017 |

OTHER PUBLICATIONS

PCT International Search Report and Written Opinion issued in International Application No. PCT/US2017/059369, dated Jan. 30, 2018, 14 pages.
EP Office Action in European Appln. No. 17800663.1, dated May 14, 2021, 7 pages.
Office Action in Chinese Appln. No. 201780062002.5, dated Nov. 30, 2022, 17 pages (with English Translation).

* cited by examiner

IMAGE PROCESSING SYSTEM FOR VERIFICATION OF RENDERED DATA

TECHNICAL FIELD

This document generally relates to verifying data, such as by using image processing techniques.

BACKGROUND

Client devices and server systems can verify the authenticity of data by processes such as digital signature verification. Digital signature verification verifies the authenticity of the data with respect to the source of the data.

Software development kits (SDKs) can be provided by server systems to enable content providers to embed data (e.g., data provided by the server systems) in content published by the content providers. The SDK provides code that can be used by a content provider to fetch data from the server system before sending the content, including the fetched data from the server system, to a client device.

SUMMARY

This document generally describes an image processing system that verifies that data rendered on client devices is being rendered in accordance with (e.g., is compliant with) instructions received via a server. For example, the image processing system confirms that data, rendered by the client device and including content embedded by software provided by the server system (e.g., of a content producer), is rendered in accordance with constraints associated with the content and in particular rendering of the content. Such constraints may take any appropriate form such as constraints associated with how the content is presented and/or what is presented with the content. The constraints may, for example, specify that an attribution (e.g., to the content producer) is included with the content as instructed by the server system of the content producer.

The image processing system has several advantages. Content producers that produce content that is provided to end users by third-party content providers often desire that the content provided is presented in a predetermined format. The predetermined format may be associated with compliance with requirements associated with the content. For example, it may be a requirement of presentation of certain content that particular information is provided with the content, such as may be required to meet legal or regulatory requirements. Additionally, or alternatively a content provider may desire that content is presented in a particular format and/or attributed to the content producer. To determine whether the predetermined format is used, the content producer retrieves data from the client device to determine whether what is actually rendered by the client device satisfies requirements associated with the predetermined format. The data processing system enables the content producer to determine whether what is actually rendered by the client device satisfies conditions specified by the content provider without compromising personal data associated with (e.g., stored on or rendered by) the client device. The data processing system enables the content producer to access data representing what is actually rendered by the client device without a priori knowledge of the structure of the rendered content, such as the structure of a webpage or application interface being rendered by the client device. The data processing system thus enables a more flexible approach for verifying that the rendered data on a remote system (e.g., the client device) includes the attribution data, while respecting the privacy of data stored and rendered on the remote system.

The image processing system enables the verification of the rendered data to occur at the client device, rather than at the server system that produced the data being rendered and being verified. Verifying at the client device ensures that no personal data is sent to the server system and that no privacy of the user of the client device is compromised. Additionally, a small amount of data (e.g., a single byte) can be used to report whether the rendered data is compliant with instructions of the content producer, which reduces bandwidth usage of the image processing system relative to a system that requires the rendered data to be sent back to the content producer's system for verification.

In some implementations, the rendered data is verified at the time of displaying the data, such as just before the data are displayed or just after the data are displayed. For example, data of the content producer that does not satisfy predetermined conditions and/or is not properly attributed can be prevented from being displayed, or some other consequence (such as a report of non-compliance being sent to the content producer) can occur, which may cause the content producer to prevent a non-compliant content provider from further using the content producer's data or software. To reduce the latency of displaying the rendered data caused by verifying the rendered data before the data are displayed, the image processing system uses image processing methods (described below) with a fast runtime (e.g., <150 ms), such as convolution with a static kernel and image processing of a portion of the rendered data that is automatically selected by the image processing system. The image processing methods of the image processing system ensure that the rendered data can be verified as compliant before being displayed without causing latencies introduced by more complex methods (e.g., use of a non-constant kernel or analyzing all of the rendered data). For example, the image processing system described herein executes rendering parameters that simplify image processing and reduce a latency for verification of a visual element, relative to a latency that occurs for processing the screenshot without rendering parameters. These rendering parameters increase image processing efficiency (relative to image processing efficiency independent of the rendering parameters) by specifying one or more particular portions of the image that need to be processed (e.g., rather than processing the entire image) and by specifying distortions that may be present in the image (which may reduce latency in image processing by pre-identifying those distorted portions, rather than an image processing engine having to identify or test for distortion during processing).

In some implementations, the image processing system includes one or more hardware storage devices that store data indicative of the predetermined criterion associated with display of the content; a content embedding engine that embeds content in a resource provided by a content provider and that configures the resource for rendering; a rendering engine that renders the content embedded in the resource; an application interface engine that interfaces with the rendering engine and that generates a visualization of the resource and of the embedded content rendered in the resource; and an image processing engine that: retrieves, from the one or more hardware storage devices, the data indicative of the predetermined criterion; processes one or more pixels of the generated visualization of the resource and of the embedded content and the resource to verify that the specified visual element satisfies the predetermined criterion; and transmits verification data including an indication of whether the predetermined criterion is satisfied.

In some implementations, the generated visualization includes a screenshot of the resource and of the embedded content rendered in the resource. In some implementations, the predetermined criterion is associated with a specified visual element. In some implementations, verifying that the specified visual element satisfies the predetermined criterion includes verifying that the embedded digital content comprises the specified visual element.

In some implementations, the specified visual element comprises a logo. In some implementations, the specified visual element comprises text. In some implementations, the one or more hardware storage devices store data indicative of rendering parameters of the specified visual element, and the image processing engine selects a portion of the resource for analyzing based on the rendering parameters of the specified visual element. In some implementations, the resource comprises one of a page of a mobile application or a webpage. In some implementations, processing one or more pixels of the generated visualization includes performing an image processing algorithm including convolution with a static kernel. In some implementations, the image processing engine retrieves, from an operating system of a device operating the image processing engine, data indicative of rendering parameters of the operating system, and the image processing engine adjusts processing one or more pixels of the generated visualization based on the rendering parameters. In some implementations, the rendering parameters are indicative of a distortion of the generated visualization, and where adjusting the analysis comprises compensating for the distortion of the generated visualization. In some implementations, the image processing engine processes one or more pixels of the generated visualization of the resource without determining a format of the resource.

In some implementations, the image processing system includes a software library including one or more portions of executable code for embedding digital content in a resource; one or more hardware storage devices for storing data indicative of the predetermined criterion; and a verification module configured to receive verification data including an indication of whether rendering by a remote device, the embedded digital content in the resource satisfies the predetermined criterion; where the one or more portions of the executable code are configured to cause the remote device to perform operations including: retrieving, from storage of the remote device, data indicative of the predetermined criterion; processing, by an image processing engine, one or more pixels of a generated visualization of the embedded digital content in the resource to verify that the predetermined criterion is satisfied; and transmitting, to the verification module, the verification data including an indication of whether the predetermined criterion is satisfied.

In some implementations, the generated visualization comprises a screenshot of the resource and of the embedded content rendered in the resource. In some implementations, the predetermined criterion is associated with a specified visual element, and verifying that the specified visual element satisfies the predetermined criterion comprises verifying that the embedded digital content comprises the specified visual element. In some implementations, the storage of the remote device stores data indicative of rendering parameters of the specified visual element, and the image processing engine selects a portion of the resource for analyzing based on the rendering parameters of the specified visual element.

In some implementations, the image processing system includes one or more hardware storage devices that store data indicative of a specified visual element; a content embedding engine that embeds content in a resource provided by a content provider and that configures the resource for rendering; a rendering engine that renders the content embedded in the resource; an application interface engine that interfaces with the rendering engine and that generates a visualization of the resource and of the embedded content rendered in the resource; and an image processing engine that: retrieves, from the one or more hardware storage devices, the data indicative of the specified visual element; processes one or more pixels of the generated visualization of the resource and of the embedded content and the resource to verify that the specified visual element is rendered in the resource with the embedded content; and transmits verification data including an indication of whether the specified visual element is rendered with the embedded content, where transmitting the verification data consumes less bandwidth than an amount of bandwidth that would be consumed by transmitting the visualization of the resource and of the embedded content rendered in the resource.

The details of one or more embodiments are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
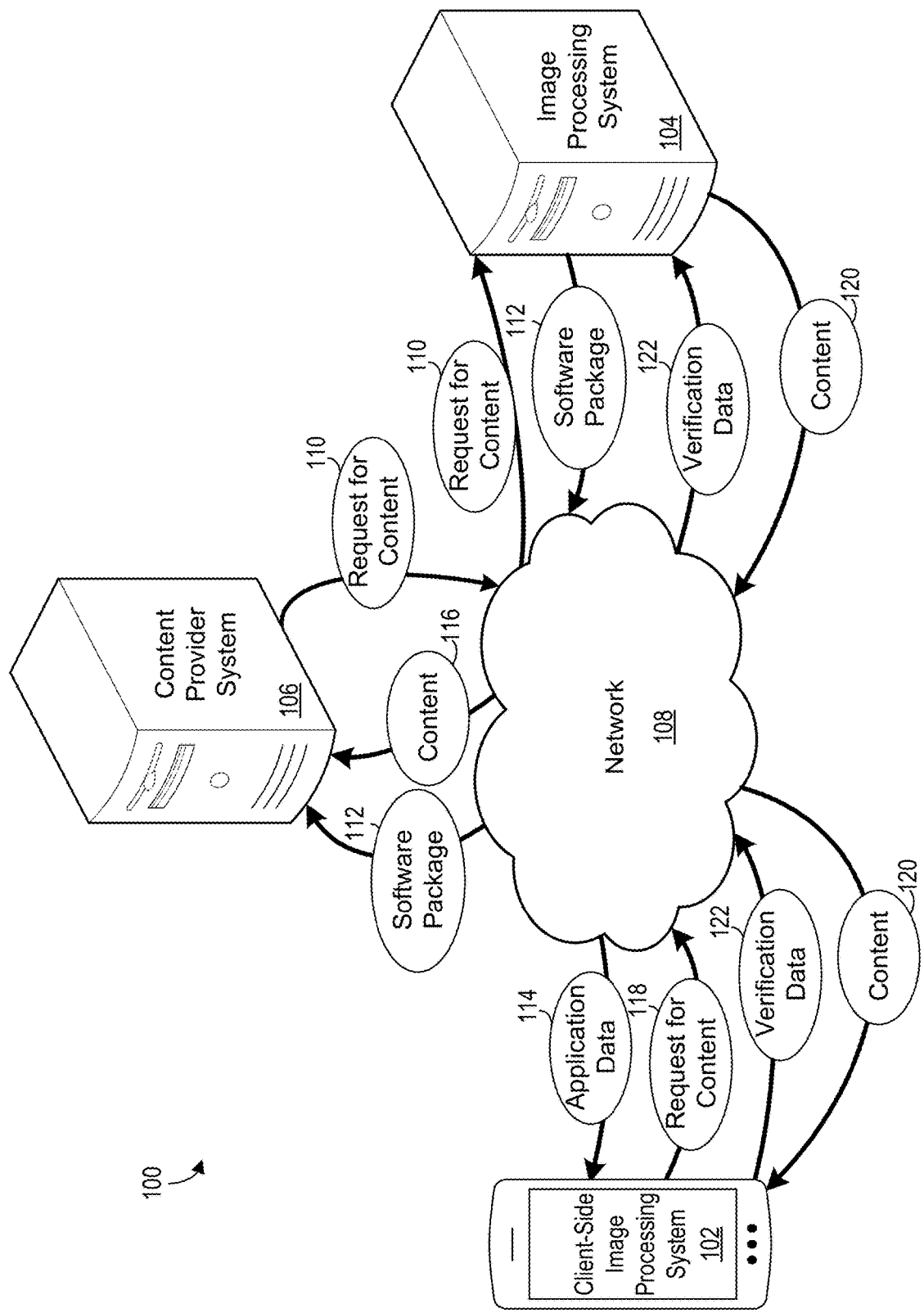
FIG. 1 is diagram of an image processing system.

FIG. 1 is diagram of a networked environment 100. The networked environment 100 includes a client-side image processing system 102, an image processing system 104, and a content provider system 106, which communicate over a network 108 (e.g., the Internet).

The networked environment 100 verifies that a resource (e.g., document, application interface, webpage, content, etc.) rendered by the client-side image processing system 102 satisfies a predetermined criterion, for example that the rendered resource includes an attribution (e.g., a visual element) indicative of a content producer (e.g., author, creator, provider, etc.) whose services provided or assisted in providing at least a portion of the resource. The portion of the resource includes content retrieved from the image processing system 104. In some implementations, the portion of the resource can include embedded content, such as a widget (e.g., newsfeed), sponsored content, a social networking interface, an in-game purchases interface, or other embedded content. Whilst the below implementation generally describes a criterion associated with including an attribution in a rendered resource, it will be appreciated that the predetermined criterion may be associated with any predetermined display format that may be associated with compliance with requirements associated with the content, for example, requirements to meet legal or regulatory requirements and/or a requirement that content is presented in a particular format.

For example, the image processing system 104 provides a software platform used by the content provider system 106 for providing (e.g., generating, assembling, sending, etc.) the resource to the client-side image processing system 102. The owner of the image processing system 104 specifies, for example, that the content provider system 106 include a visual element that represents the image processing system 104. The content provider system 106 provides the resource (e.g., a webpage, application, program, script or other executable logic, etc.) to the client-side image processing system 102. When the resource is rendered by the client-side image processing system 102 (e.g., caused by the script, program, etc. of the content provider system 106), the visual element is displayed in the resource on the user interface (e.g., screen) of the client-side image processing system 102. The visual element indicates to the user that at least a portion of the content in the resource is produced by the image processing system 104.

The visual element can be rendered in the resource on the client-side image processing system 102 (e.g., caused by a script, program, or other logic provided by the content provider system 106) according to specifications provided by the image processing system 104. In some implementations, the image processing system 104 specifies that the visual element be included in the resource as a condition of providing or assisting in providing at least a portion of the resource for the image processing system 104 and for the client-side image processing system 102. In some implementations, the visual element indicates to a user of the client-side image processing system 102 that the image processing system 104 provided or assisted in providing (either directly or indirectly) at least a portion of the resource. In some implementations, the location of the visual element indicates which portion of the resource is being provided by the image processing system 104 (e.g., a portion including or otherwise proximate the visual element).

The image processing system 104 verifies that the content provider system 106, by generating or otherwise providing the resource to the client-side image processing system 102, has included the visual element for being rendered in the resource as agreed upon by the operators of the image processing system 104 and the content provider system 106 as a condition of the image processing system 104 providing (either directly or indirectly) the portion of the resource.

For verification of the rendering of the visual element in the resource, the image processing system 104 receives data from the client-side image processing system 102 confirming that the visual element was rendered by the client-side image processing system 102. The networked environment 100 is configured to cause the client-side image processing system 102 to perform operations for verification as to whether the visual element is rendered in the resource, rather causing the image processing system 104 (or another system) to perform the verification operations. Locally performing the verification at the client-side image processing system 102 enables the client-side image processing system 102 to send verification data 122 to the image processing system 104 without including personal data related to a user of the client-side image processing system 102, preserving privacy of a user of the client-side image processing system 102. In some implementations, the networked environment 100 causes the client-side image processing system 102 to send (e.g., transmit) no data related to the client-side image processing system 102 to the image processing system 104 that could be used to identify the client-side image processing system 102, such as a device identifier, IP address, MAC address, or other identifying data for the purpose of verifying the presence of the visual element in the rendered resource.

Rather, in this example, the networked environment 100 causes the client-side image processing system 102 to send only verification data 122 indicative of whether the visual element is verified as present in the rendered resource. For example, the verification data 122 includes a bit of data (either a "1" or a "0") indicating the status of the visual element in the resource. In some implementations, for multiple instances of verification in a single resource, a specified amount of data (e.g., a string of data) can be sent including an identifier for each visual element. The specified amount of data being sent by the client-side image processing system 102 to the image processing system 104 reduces bandwidth usage relative to transmitting the data comprising the rendered resource to the image processing system 104.

To locally verify the presence of the visual element at the client-side image processing system 102 (thus preserving privacy and lowering bandwidth usage as describe above), the networked environment 100 causes the client-side image processing system 102 to perform one or more image processing operations on data representing the resource when the resource is rendered by the client-side image processing system 102. In some implementations, the networked environment 100 causes the client-side image processing system 102 to perform the verification at the time of rendering of the resource by the client-side image processing system 102. In some implementations, the networked environment 100 causes the client-side image processing system 102 to perform the verification at a later time (e.g., after the resource is being displayed to the user). The image processing operations are described in greater detail below in relation to FIGS. 3A-3C.

The image processing system 104 includes one or more processing devices (e.g. a server system) that host content for distribution to one or more other computing systems over the network 108. The image processing system 104 stores one or more software libraries (e.g., software development kits, or "SDKs") that are accessible by one or content provider systems (e.g., content provider system 106) for use in providing content (e.g., text, images, videos, applications, executable scripts, etc.) to one or more client devices (e.g., client-side image processing system 102).

For example, the content provider system 106 can be a website host configured to retrieve newsfeed items for a newsfeed widget on a webpage of the website. The image processing system 104 provides a software package 112 including an executable script (e.g., a content embedding script). The software package 112 can be accessed (e.g., downloaded) by the content provider system 106 and added to the webpage or otherwise used to build the webpage (e.g., the runtime environment). The software package 112 is used by the content provider system 106 in the webpage to cause a client-side image processing system 102 that is rendering the webpage to send a request for content 110 from another system (e.g., the image processing system 104). The content provider system 106 retrieves the content 116 (e.g., the newsfeed items) from the image processing system 104 or other content producer system. The image processing system 104 specifies that the webpage should include near the newsfeed a visual element referencing the image processing system 104. The client-side image processing system 102 performs verification operations (as described above and in relation to FIGS. 3A-3C) and sends verification data 122 to the image processing system 104.

In another example, the content provider system 106 can be an application provider (such as a mobile game publisher). The image processing system 104 owner may desire to include embedded content (e.g., sponsored content, in-app purchasing controls, a social network interface, etc.) in a game being published by the image processing system 104. The content provider system 106 provides application data 114 (e.g., the game) including the resource to the client-side image processing system 102. In this example, when an interface (e.g., the resource) of the game is rendered by the client-side image processing system 102 that downloaded the application data 114 provided by the content provider system 106, a request for content 118 is sent by the client-side image processing system 102 to another device (e.g., image processing system 104). The sponsored content (e.g., content 120) is retrieved from the other system (e.g., image processing system 104) and embedded into the interface of the application (e.g., the mobile game). The sponsored content is displayed by the client-side image processing system 102 in the interface of the game. The image processing system 104 specifies that the game interface should include a visual element that represents the image processing system 104. In some implementations, the image processing system 104 specifies that the visual element be located in the resource near (e.g., inside of) the sponsored content. The client-side image processing system 102 performs verification operations (as described above and in relation to FIGS. 3A-3C) and sends verification data 122 to the image processing system 104.

The image processing system 104 can host content 116, 120 (e.g., text, images, videos, applications, executable scripts, etc.) to be included in resources provided by the content provider system 106. In some implementations, the image processing system 104 sends the content 116 to the content provider system 106, where the content 116 is assembled with content of the content provider system 106 before sending to the client-side image processing system 102 for rendering. In some implementations, the image processing system 104 sends the content 120 directly to the client-side image processing system 102, such as in response to a request for content 118 caused by executable logic embedded in an application operating on the client-side image processing system 102.

The content provider system 106 includes one or more computing devices (e.g., a server system) that is operated by a content publisher. While the image processing system 104 provides content 116, 120 that is typically embedded into a resource, the content provider system 106 includes systems configured to provide the resources themselves. For example, the content provider system 106 can include the system of an application publisher, such as for a mobile game, a music application, mapping application, ride service application, or any such application provided by a publisher for running on the client-side image processing system 102. For these applications, the content 116, 120 is typically embedded content that is embedded using the software package 112 (e.g., an SDK) of the image processing system 104 to enable a functionality with respect to the embedded content in the application. For example, the application publisher may desire to interface the application with a social networking platform provided by the image processing system 104. The image processing system 104 provides the SDK to assist the content provider system 106 with including the social networking platform access in the application being provided by the content provider system 106. In one example, the content provider system 106 includes a website publisher. The content provider system 106 may desire to include embedded content in the website, and may desire to embed the content in the website using the software package 112 (e.g., an SDK) of the image processing system 104. In these cases, the verification operations verify that the visual element of the content provider system 106 is included by the content provider system 106 to display with the content 116, 120. The visual element indicates that the image processing system 104 provided the software package 112 to the content provider system 106 for use in generating the resource (e.g., that the platform of the image processing system 104 is being used).

Figure 2:
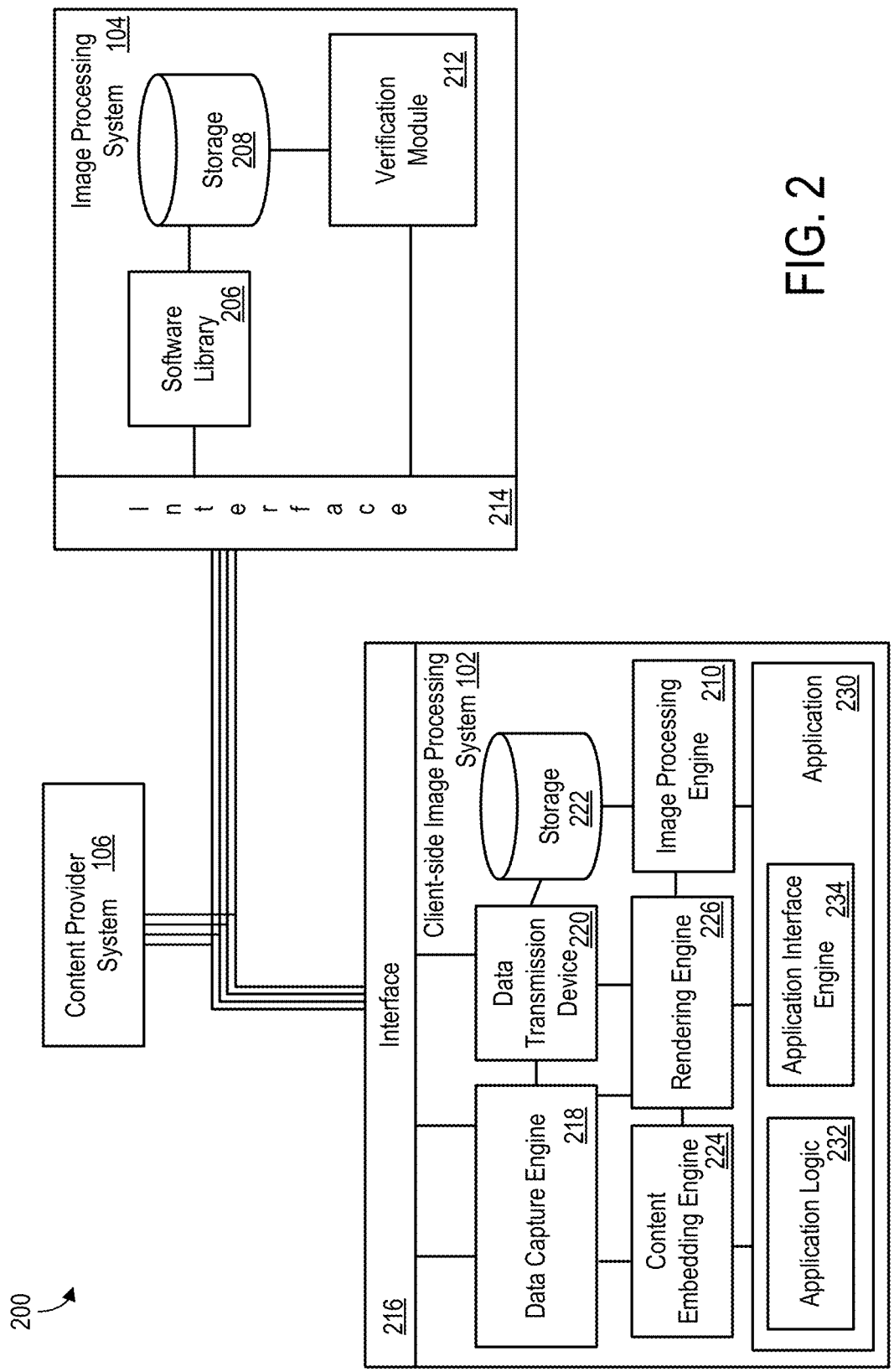
FIG. 2 is a block diagram showing components of the image processing system.

FIG. 2 is a block diagram showing components of an image processing system 200 (e.g., an implementation of networked environment 100). The image processing system 200 includes the image processing system 104, the content provider system 106, and the client-side image processing system 102.

The image processing system 104 includes a software library 206, storage 208, a verification module 212, and an interface 214. The image processing system 104 includes a platform that can be accessed by one or more content provider systems and from which content can be retrieved and embedded into one or more resources by the client-side image processing system 102 or the content provider system 106. For example, the image processing system 104 can include an ad exchange, a social network website, a shopping website, a newsfeed provider, or any platform from which content can be retrieved and embedded into a resource (e.g., an application page, a website, etc.). The image processing system 104 can include a single system that provides both the software library 206 and other content to be retrieved by the client-side image processing system 102 or the content provider system 106. In some implementations, the image processing system 104 includes two or more systems, such as a first system that provides the software library 206 and a second system that provides the content retrieved by a client-side image processing system 102. In some implementations, the content produced by the image processing system 104 is stored at the image processing system 104 in storage 208. The interface 214 is configured to send and receive data, such as over network 108.

The image processing system 104 includes software library 206 that enables a content provider system 106 to retrieve content from the image processing system 104 and embed the content into a resource provided by the content provider system 106. The software library 206 includes a Software Development Kit that can facilitate development of a resource which retrieves content from the image processing system 104 (or another system). In some implementations, the software provided by the library includes executable logic, code snippets, etc. that can be combined with the code of a resource to embed content in the resource. In some implementations, the software of the software library 206 causes the client-side image processing system 102 to retrieve content (e.g., from the image processing system 104) to embed in the resource when the resource is being rendered. In some implementations, the software of the software library 206 includes embedded content in a package, and does not cause content to be retrieved by the client-side image processing system 102.

The image processing system 104 includes a verification module 212 that parses data received from other devices (such as the client-side image processing system 102) and determines whether the specified visual element was rendered appropriately by the client-side image processing system 102. In some implementations, the verification module 212 receives the verification data indicative of a proper rendering. The verification module 212 sends a signal to another system (e.g., an ad exchange), which then may take an action based on the verification of the presence of the specified visual element. For example, in an ad context, the ad exchange may only compensate the operator of the content provider system 106 when the verification data indicates that the visual element has been rendered properly. For example, in a social networking context, a social networking feed can be triggered to resend data based on the verification data indicating that the visual element has not been rendered properly. In some implementations, when the visual element has not been triggered properly, the image processing system 104 can send a signal to the client-side image processing system 102 to prohibit the client-side image processing system 102 from displaying the embedded content.

The client-side image processing system 102 includes a computing device, such as a laptop, tablet, mobile phone, or other computing device. The client-side image processing system 102 includes a terminal device on which one or more resources are rendered and displayed. The client-side image processing system 102 includes an image processing engine 210, a data capture engine 218, a data transmission device 220, storage 222, a content embedding engine 224, a rendering engine 226, and an interface 216. The client-side image processing system 102 can include an application 230 (e.g., installed on the client-side image processing system 102). The application 230 includes application logic 232 and an application interface engine 234.

The data capture engine 218 is configured to capture the data that is rendered by the client-side image processing system 102 (e.g., data to be displayed/being displayed by the client-side image processing system 102). In some implementations, the data capture engine 218 takes a "screenshot" or "snapshot" of the rendered data of a resource. For example, when a resource is rendered, a signal is sent to the data capture engine 218 to take a screenshot. The data capture engine 218 captures the data and provides it to the image processing engine 210 for analysis, as describe below in FIGS. 3A-3C. In some implementations, the data capture engine 218 also receives rendering parameters of the rendered resource. Rendering parameters include the resolution, font sizes, presence/absence of various fields, or other structural information about the resource page to assist the image processing engine 210 in its analysis of the resource screenshot. For example, the data capture engine 218 can interrogate the operating system of the client-side image processing system 102 to determine distortions of the visual element caused by the rendering, such as screen size and stretching or skewing of the resource that can occur when the resource is being rendered for display on the client device. In some implementations, the data capture 218 can determine whether there has been compression of the visual element, which can introduce further distortions in the visual element. In some implementations, the data capture engine 218 receives an expected location of the visual element on the screen. For example, the content provider system 106 can send an expected location of the visual element (e.g., bounding box for each instance of the visual element). The data capture engine 218 sends the rendering parameters to the image processing engine 210 in addition to the screenshot of the resource to assist the image processing engine 210 in determining that the visual element is present. The rendering parameters provided simplify image processing and reduce a latency for verification of the visual element, relative to a latency that occurs for processing the screenshot without rendering parameters. These rendering parameters increase image processing efficiency (relative to image processing efficiency independent of the rendering parameters) by specifying one or more particular portions of the image that need to be processed (e.g., rather than processing the entire image) and by specifying distortions that may be present in the image (which may reduce latency in image processing by pre-identifying those distorted portions, rather than an image processing engine having to identify or test for distortion during processing). In some implementations, where the resource is displayed after verification is confirmed by the image processing engine 210, the image processing introduces a latency between rendering the resource and displaying the resource. By reducing the image processing time through the techniques described above, the latency of displaying the resource is reduced while still enabling verification of the presence of the visual element.

The content embedding engine 224 receives the content (e.g., from the image processing system 104 or the content provider system 106 or both). In some implementations, the content is already in storage 222 as a part of application 230. The content embedding engine 224 configures the resource for rendering by the client-side image processing system 102 by running the script or other logic provided by the image processing system 104. The content embedding engine 224 assembles the resource content and then sends the resource to the rendering engine 226 for rendering. The rendering engine 226 renders the content embedded in the resource, as well as the resource itself.

The application 230 can include any program for running on the client-side image processing system 102 that requests content for embedding in the application. For example, application 230 can include a browser, social network application, mobile game, mapping application, newsfeed, etc. The application 230 includes application logic 232 for running the application. The application 230 includes an application interface engine 234 that interfaces with the rendering engine 226 and generates a visualization of the embedded content rendered in the resource.

The image processing engine 210 receives the visualization from the application interface engine 234 (e.g., via the data capture engine 218). The image processing engine 210 processes one or more pixels of the generated visualization and verifies that the specified visual element is present in the visualization. In some implementations, the visual element is stored in storage 222, such as when the application 230 is downloaded, and retrieved by the image processing engine 210 as a pattern to compare the generated visualization (or a portion thereof) against. The image processing engine 210 processes the generated visualization as describe in relation to FIGS. 3A-3C below.

The image processing engine 210 generates verification data (e.g., verification data 122), which can include a single bit or other data that indicates whether the visual element is present in the rendered visualization. The verification data is sent to the data transmission device 220 which sends the data (via interface 216) to the image processing system 104 (or another remote device) to indicate whether the visual element is present in the resource. In some implementations, the verification is sent as a ping when the resource is rendered. The image processing system 104 can use anti-spam software to determine whether the ping is genuine or whether verification is being spoofed by the application 230. For example, the anti-spam measure can include digital signatures to verify client information, detect emulators, data farming, false signals, etc. These systems are similar to those used to monitor clicks of embedded content (such as ads). In this case, only the verification data is sent to the remote device, and no personal information of the client-side image processing system 102 or operator of the client device is sent to the remote device. The image processing of the visualization occurs at the client-side image processing system 102 to protect the privacy of the user of the client-side image processing system 102. The personal information included in the screenshot captured by the data capture engine 218 is thus kept local on the client-side image processing system 102 and not transmitted over the network 108.

However, while no personal data is generally transmitted to the image processing system 104, for situations in which the systems discussed here collect and/or use personal information about users, the users may be provided with an opportunity to enable/disable or control programs or features that may collect and/or use personal information (e.g., information about a user's social network, social actions or activities, a user's preferences or a user's current location). In addition, certain data may be treated in one or more ways before it is stored or used, so that personally identifiable information associated with the user is removed. For example, a user's identity may be anonymized so that the no personally identifiable information can be determined for the user, or a user's geographic location may be generalized where location information is obtained (such as to a city, ZIP code, or state level), so that a particular location of a user cannot be determined.

Figure 3A:
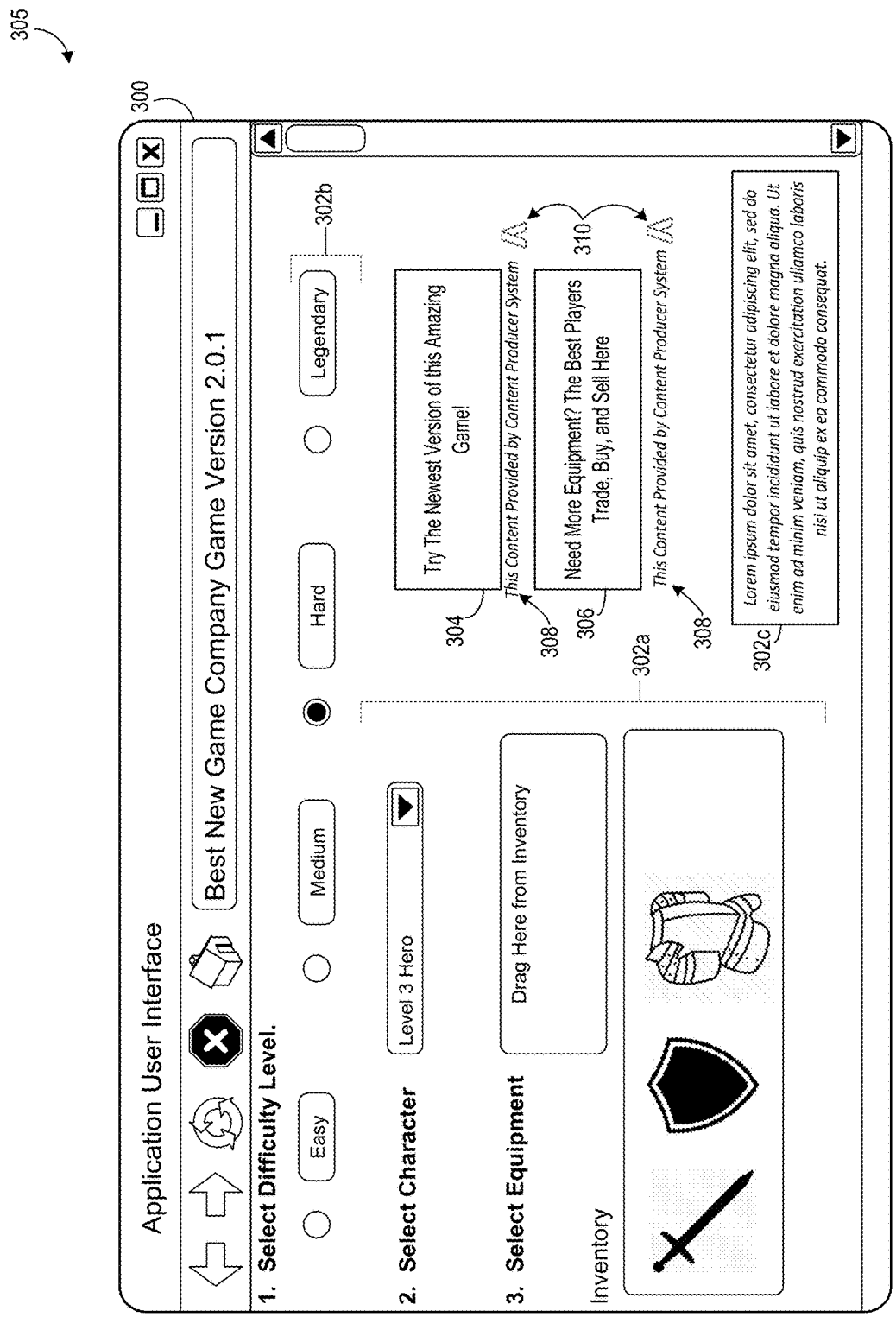
FIGS. 3A-3C show example screenshots of application interfaces.
Figure 3B:
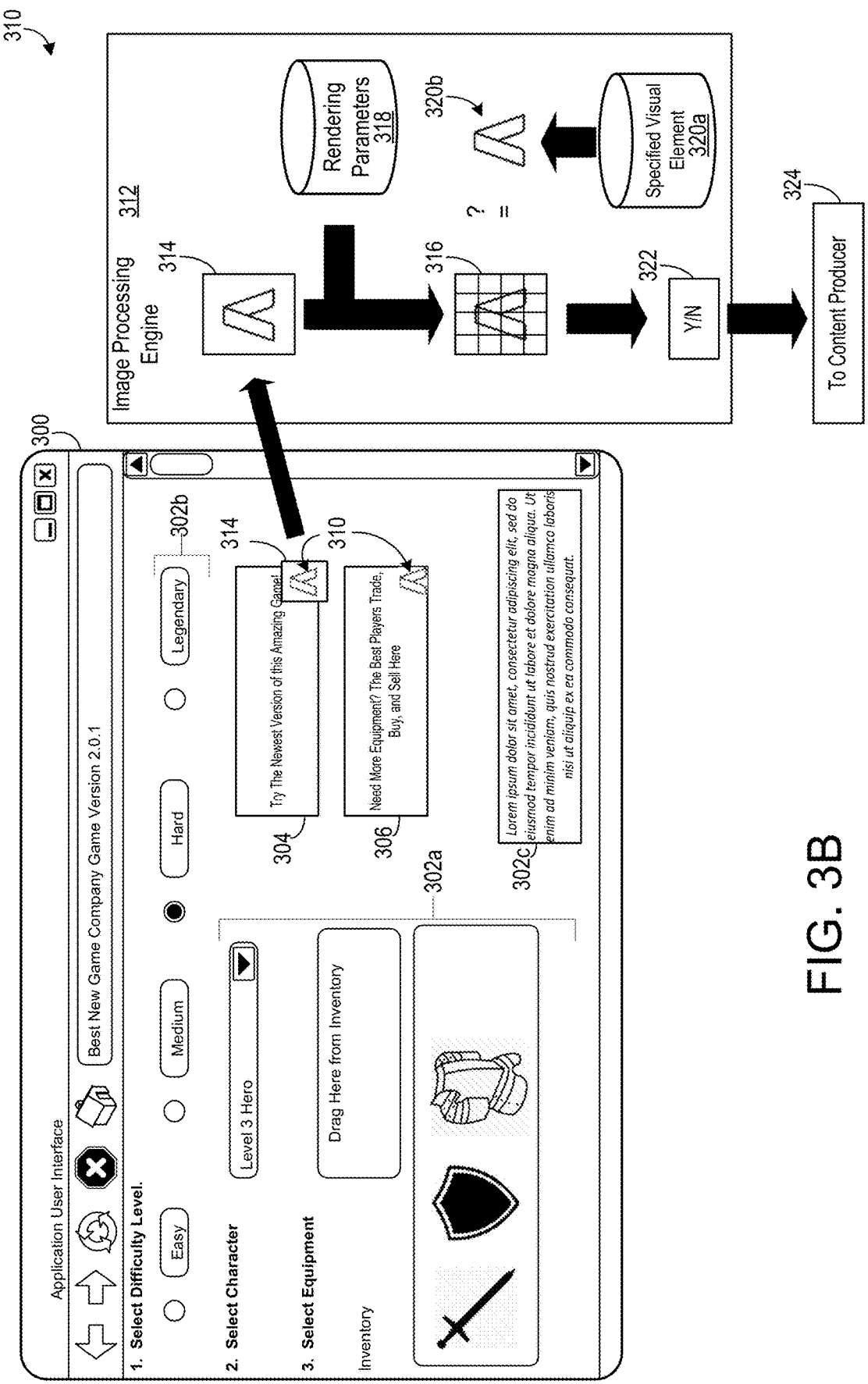
Figure 3C:
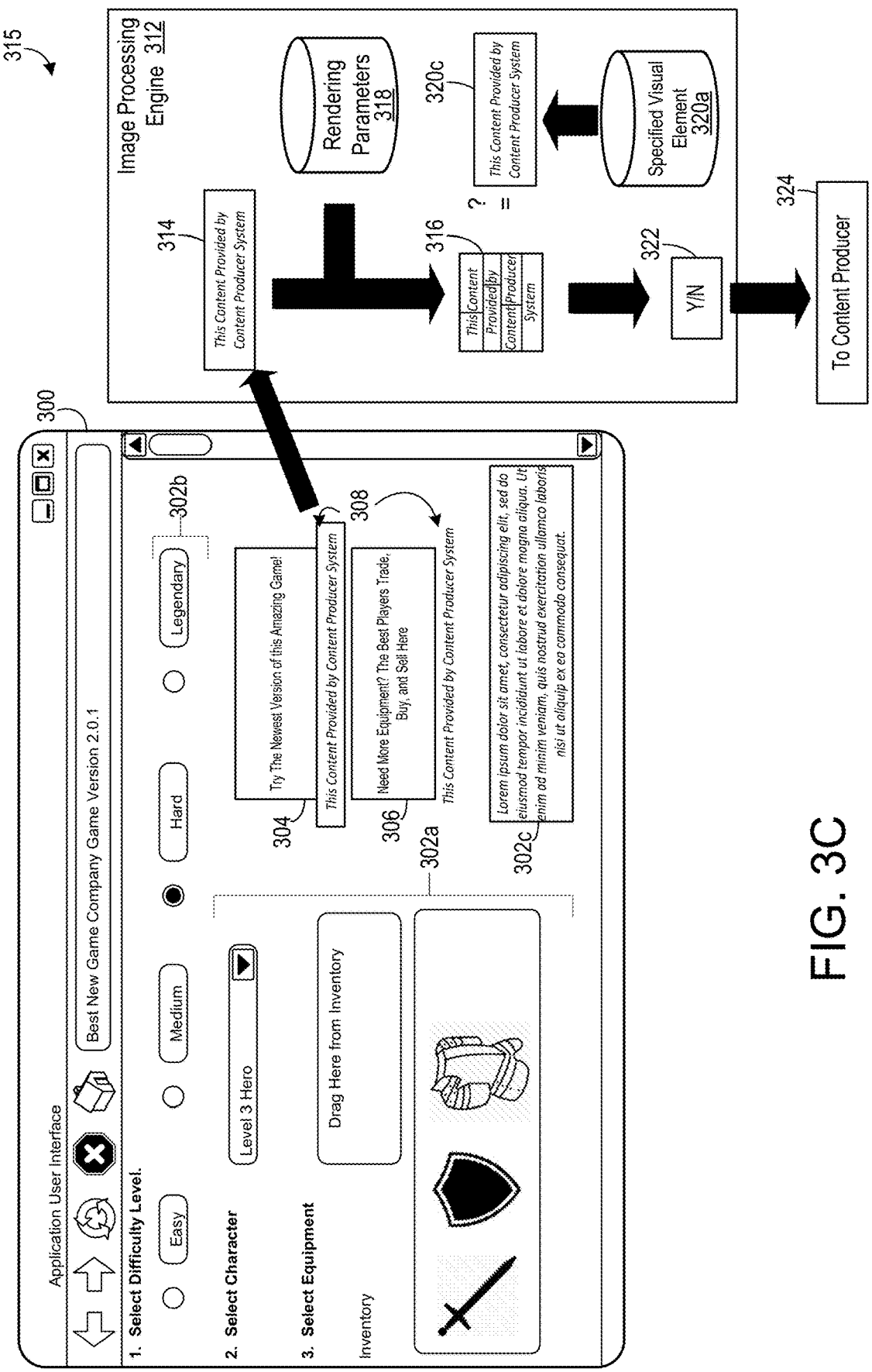

FIGS. 3A-3C show example screenshots 305, 310, 315 of application interface 300 (e.g., an example of a resource). The image processing engine (e.g., image processing engine 210) processes screenshots of interfaces such as interface 300 (or portions thereof) to determine whether the visual element is present. The image processing engine uses image processing techniques that are available at the client-side image processing system 102 and that are fast (<100 ms) and reliable. For example, by importing the rendering parameters, the image processing engine uses pre-calculated or pre-determined thresholds for various image processing algorithms. For example, the image processing engine can import preset HSV/HSI thresholds, kernel sizes, filter values, and so forth. By importing the rendering parameters, the image processing engine does not need to calculated compensation metrics for matching the processed image to the retrieved visual element (e.g., visual elements 320*b*-*c*). The image processing engine can perform one or more image processing algorithms, including feature detection such as by edge detection, Hough transform, scale-invariant feature transforms, segmentation, and so forth.

Turning to FIG. 3A, interface 300 includes content 302*a*, 302*b*, 302*c* for a game application, such as a mobile game on a smart phone. Content 302*a*-*c* include various modules and controls that enable the user to interact with the interface. The interface 300 includes embedded content 304, 306. For example, embedded content 304 incudes a promotion for a newer version of the game by the content provider system 106. For example, embedded content 306 includes an image including a link to a forum (e.g., a social network) for players of the game. The embedded content 304, 306 can be randomly generated and retrieved by the script that was produced by a content producer system (e.g., image processing system 104) and put into the application by content provider system (e.g., content provider system 106). The script causes the application to fetch embedded content 304, 306 and embed it into the interface 300. Proximate the content 304 are text visual element 308 and icon visual element 310. Proximate the content 306 are text visual element 308 and icon visual element 310. The icon 310 and the text 308 can be specified by the content producer system to be shown near embedded content provided using the script produced by the content producer system or near embedded content produced by the content producer system. The visual element can include on or more of a logo, text, image, etc. In some implementations, a library of alternate images, logos, text, etc. are provide to the client device and stored for comparison to the visual element. In some implementations, the content provider system 106 provides the particular visual element being used in the resource. The visual element can be any shape, size, color, orientation, etc.

Turning to FIG. 3B, a screenshot of a portion of interface 300 is processed by an image processing engine 312 (e.g., image processing engine 210). The methods for processing the screenshot include methods that are simple such that processing is less than or approximately equal to 100 ms. In some implementations, the processing time can be up to 250 ms. The image processing does not require knowledge of the structure of the resource to determine the presence or absence of the visual element. The image processing is less invasive than parsing the structure of the resource to determine whether data representing the visual element are present in the resource. The image processing is faster than parsing the structure of the resource to determine whether data representing the visual element are present in the resource. The image processing can be simplified using information received from the content provider system that provided the resource, such as where on the interface 300 the visual element should appear (e.g., a bounding box for the visual element). Compression and resolution data can be retrieved as described above to further reduce image processing time and increase the accuracy of the image processing. For example, compression and rendering parameters, operating system rendering distortions, etc. can be used to tune image processing thresholds, reduce complexity of the image processing algorithm, increase accuracy of the verification, and reduce processing time. In some implementations, these techniques are used because machine learning is not available at the client device for verifying the visual element, as no training data are available.

To process the logo 310, the image processing engine 312 receives dimensions of bounding box 314 that indicate a region of the resource on which the image processing should occur. The region of the interface inside bounding box 314 is processed using one or more image processing algorithms, such as convolution with a static kernel. The rendering parameters 318 (e.g., retrieved from the operating system by the data capture engine 218) are used to assist the image processing engine 312. The image processing engine 312 retrieves the specified visual element 320*b* is retrieved from storage 320*a* and compares the specified visual element 320*b* to the processed image 316. The image processing engine 312 generates verification data 322 and sends the data to a remote device, such as the content producer 324.

Turning to FIG. 3C, interface 300 is shown which includes text 308 as a visual element. Similar to the image processing of the logo 310 of FIG. 3B, to process the text 308, the image processing engine 312 receives dimensions of bounding box 314 that indicate a region of the resource on which the image processing should occur. The region of the interface inside bounding box 314 is processed using one or more image processing algorithms, such as convolution with a static kernel. The rendering parameters 318 (e.g., retrieved from the operating system by the data capture engine 218) are used to assist the image processing engine 312. The image processing engine 312 retrieves the specified visual element 320c is retrieved from storage 320a and compares the specified visual element 320b to the processed image 316. The image processing engine 312 generates verification data 322 and sends the data to a remote device, such as the content producer 324. In some implementations, the image processing engine 312 receives data indicating that the visual element 316 comprises text, and performs optical character recognition (OCR) image processing on the visual element 316.

In some implementations, in addition to or alternative to image processing to verify that data is rendered, "audio processing" can be performed to verify that that a predetermined audio output by a device is actually being output by the device in accordance with the predetermination. For example, in a voice activated device (e.g., the client device in this case), content providers might provide plugins or modules to enable a user of the client device communicate directly with services of the content provider. The image processing system can enable the content providers to integrate these services with interface of the voice activated device so that the user can access the content provider's content via the voice activated device. The image processing system can monitor generated audio data by the voice activated device to verify that content provided by the image processing system (or any other device) are correctly attributed in the audio data (e.g., speech data) generated by the voice activated device. In some implementations, the device need not be a voice-activated device, but instead can be any device provided an auditory output along with (e.g., in response to a request for) data from the content provider. The image processing system can verify that a particular word is spoken, a particular tone (e.g., theme, etc.) is played, and so forth in along with data provided by the content provider. In some implementations, the process for audio processing for verification of rendered data is similar to the image processing examples describe through this document, where image processing techniques are replaced with signal processing techniques for audio output. For example, techniques including heterogeneous parameter sets that mix absolute spectral information with dynamic, or time-derivative, spectral information, Hidden Markov models, and so forth can be used.

Figure 4:
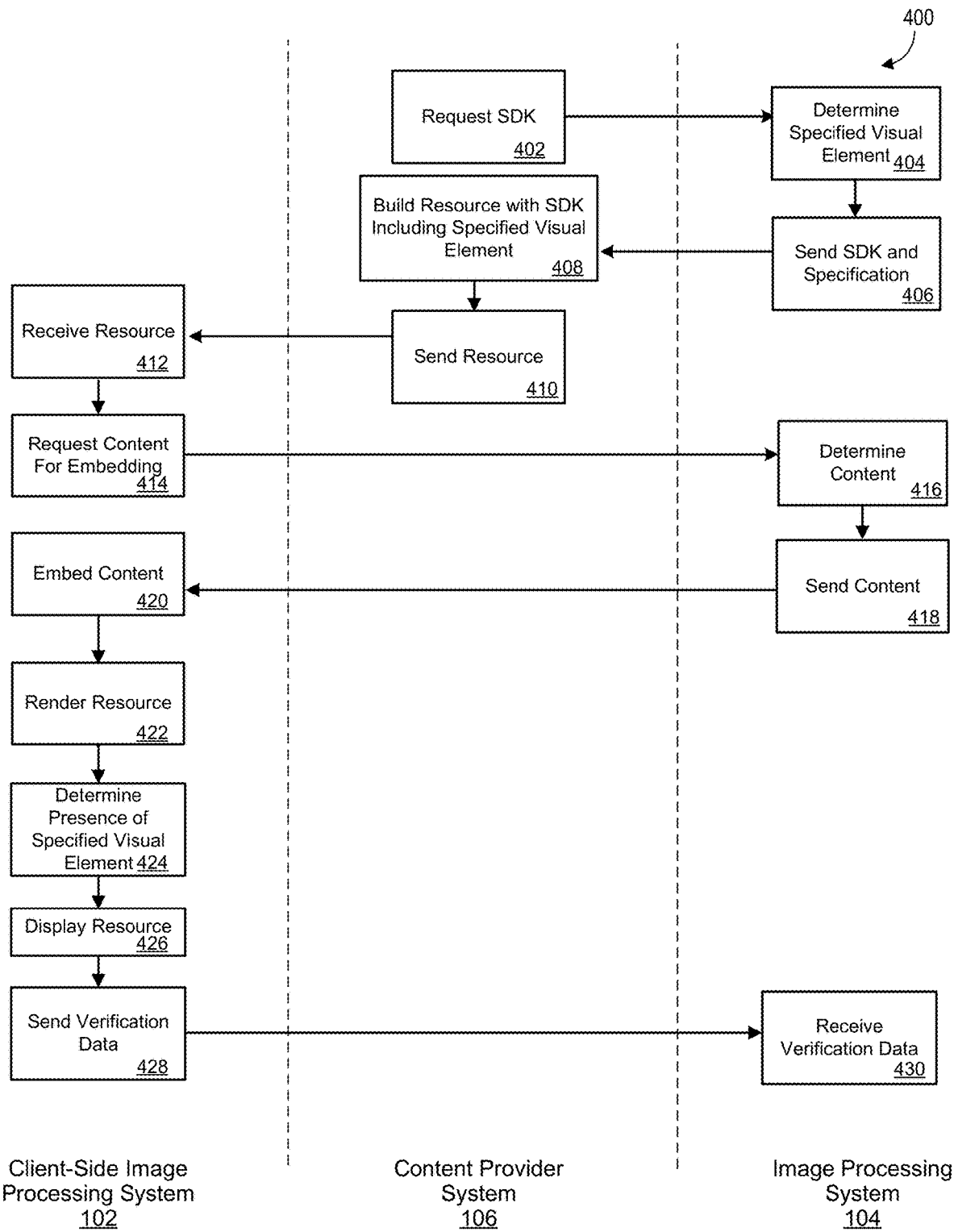
FIG. 4 flow diagram of actions taken by systems of the image processing system.

FIG. 4 is flow diagram of actions 400 taken by systems of the image processing system (e.g. networked environment 100). The content provider system 106 requests (402) software (such as an SDK) from the image processing system 104. The image processing system 104 determines (404) a specified visual element (or library of elements) and sends (406) the requested software to the image processing system 104 along with the specified element(s). The specified element is to be shown with any content embedded using the software provided by the image processing system 104 in resources provided to the client-side image processing system 102 by the image processing system 104. The content provider system 106 builds (408) the resource with the software, including the specified visual element. The image processing system 104 sends (410) the resource to a client-side image processing system 102. The resource can be an application or part of an application, a webpage or other document, and so forth. The client-side image processing system 102 receives (412) the resource. When the resource is activated (e.g., at runtime), the client-side image processing system 102 requests (414) content for embedding into the resource, such as from the image processing system 104. The image processing system 104 determines (416) which content to provide (e.g., via an auction or other content evaluation mechanism). The image processing system 104 sends (418) the content to the client-side image processing system 102. The client-side image processing system 102 embeds (420) the content in the resource. The client-side image processing system 102 renders (422) the resource. The client-side image processing system 102 determines (424) the presence of the specified visual element, such as using the image processing engine. The client-side image processing system 102 displays (426) the resource and sends (428) the verification data to be received (430) by the image processing system 104. In some implementations, the verification data is sent (428) before the resource is displayed (426) by the client-side image processing system 102.

Figure 5:
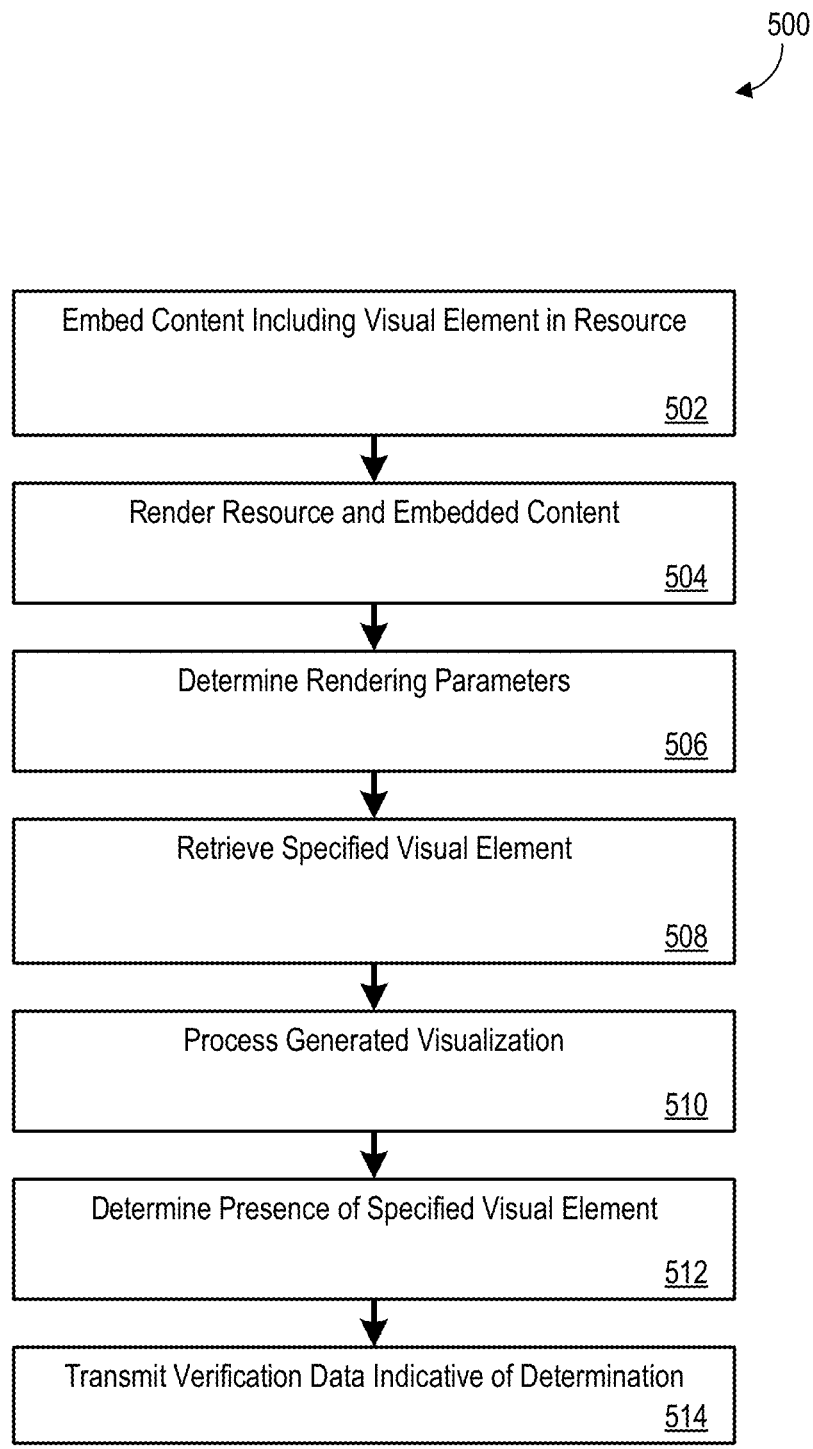
FIG. 5 is a flow diagram showing actions of the image processing system.

FIG. 5 is a flow diagram showing actions 500 of the image processing system. The image processing system embeds (502) the content including the visual element in a resource, such as a resource provided by the content provider system 106. The image processing system renders (504) the resource and the embedded content. The image processing system determines (506) rendering parameters. The image processing system retrieves (508) the specified visual element. The image processing system processes (510) the generated visualization. The image processing system determines (512) the presence of the specified visual element. The image processing system transmits (514) verification data indicative of the determination results.

Figure 6:
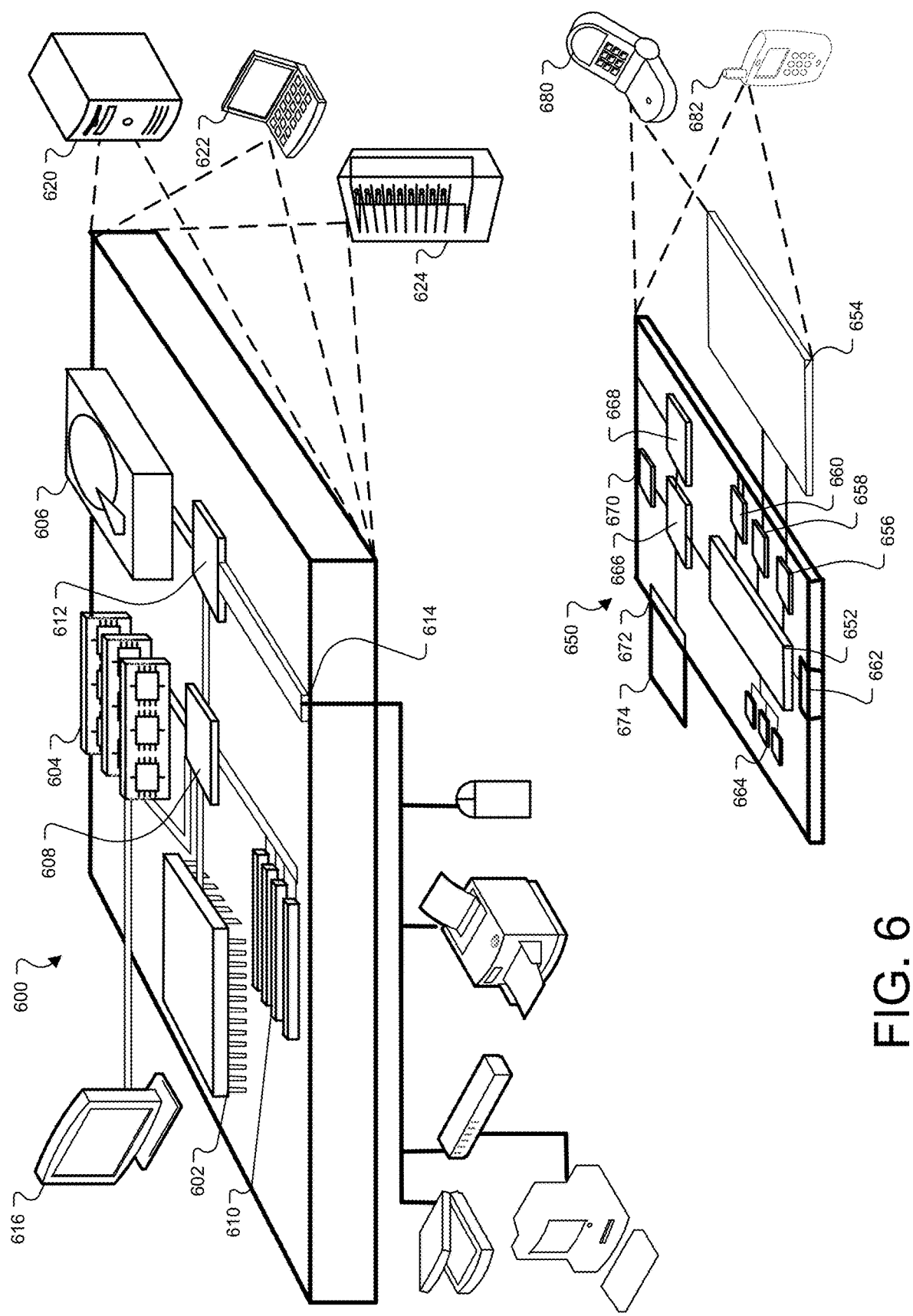
FIG. 6 is a block diagram of a computing system for the image processing system.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. Additionally, computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In-Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for the image processing system may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A client-side image processing system for verifying that embedded digital content comprises a specified visual element, the image processing system comprising:
   an interface to one or more hardware storage devices of a remote image processing system that store data indicative of a specified visual element;
   a client device having one or more processors and memory, configured by one or more scripts provided by the remote image processing system to perform operations comprising:
      embedding content in a resource obtained by the client device from a content provider;
      configuring the resource for rendering, wherein the data indicative of the specified visual element is different from the resource obtained from the content provider;
   rendering the content embedded in the resource;
   capturing an image (i) of the resource and (ii) of the embedded content rendered in the resource; and
      retrieving, from the one or more hardware storage devices of the remote image processing system, the data indicative of the specified visual element;
      comparing the captured image to the retrieved data indicative of the specified visual element without requiring a structure of the resource to be parsed as part of a verification that the specified visual element (i) is visually present in the resource with the embedded content and (ii) visually indicates that the embedded content is produced by the remote image processing system; and
      transmitting verification data comprising an indication of whether the specified visual element is visually presented with the embedded content based on the comparison, wherein transmitting the verification data consumes less bandwidth than an amount of bandwidth that would be consumed by transmitting the visualization of the resource and of the embedded content rendered in the resource.

2. The image processing system of claim 1, wherein the captured image comprises a screenshot of the resource and of the embedded content rendered in the resource.

3. The image processing system of claim 1, wherein the one or more hardware storage devices store data indicative of rendering parameters of the specified visual element, and wherein the image processing engine selects a portion of the resource for analyzing based on the rendering parameters of the specified visual element.

4. The image processing system of claim 1, wherein the resource comprises one of a page of a mobile application or a webpage.

5. The image processing system of claim 1, wherein comparing the captured image to the retrieved data comprises performing an image processing algorithm comprising convolution with a static kernel.

6. The image processing system of claim 1, wherein the image processing engine retrieves, from an operating system of a device operating the image processing engine, data indicative of rendering parameters of the operating system, and wherein the image processing engine adjusts processing the captured image based on the rendering parameters.

7. The image processing system of claim 6, wherein the rendering parameters are indicative of a distortion level, and wherein adjusting the processing based on the rendering parameters comprises compensating for the distortion level.

8. The image processing system of claim 1, wherein the specified visual element comprises a logo.

9. The image processing system of claim 1, wherein the specified visual element comprises text.

10. An image processing system for verifying that embedded digital content comprises a specified visual element, the image processing system comprising:
    a memory device storing a software library comprising one or more portions of executable code for embedding digital content in a resource;
    one or more hardware storage devices storing data indicative of a specified visual element; and
    one or more data processing devices configured to execute instructions that cause the one or more data processing devices to perform operations comprising:
    receiving verification data comprising an indication of whether the specified visual element is rendered, by a remote device, with the embedded content in the resource as a visual indication that the embedded content was produced by the image processing system;
    wherein the one or more portions of the executable code are configured to cause the remote device to perform operations comprising:
        retrieving data indicative of the specified visual element;
        capturing an image of (i) a resource obtained from a content provider and (ii) embedded content obtained, by the remote device, from a source that differs from the content provider and rendered in the resource;
        comparing the captured image to the retrieved data indicative of the specified visual element without requiring a structure of the resource to be parsed as part of a verification that the specified visual element (i) is rendered with the embedded content and (ii) visually indicates that the embedded content is produced by the image processing system; and
        transmitting, to the image processing system, the verification data comprising an indication of whether the specified visual element is visually presented with the embedded content based on the comparison, wherein transmitting the verification data consumes less bandwidth than an amount of bandwidth that would be consumed by transmitting data representing the resource and the embedded content.

11. The image processing system of claim 10, wherein the image processing engine retrieves, from an operating system of a device operating the image processing engine, data indicative of rendering parameters of the operating system, and wherein the image processing engine adjusts processing the captured image based on the rendering parameters.

12. The image processing system of claim 11, wherein the rendering parameters are indicative of a distortion, and wherein adjusting the processing comprises compensating for the distortion.

13. The image processing system of claim 10, wherein the specified visual element comprises a logo.

14. The image processing system of claim 10, wherein the specified visual element comprises text.

15. A method for verifying that embedded digital content of a rendered resource comprises a specified visual element, the method being performed by a client device and comprising:
    embedding content in a resource provided by a content provider that configures the resource for rendering;
    rendering the embedded content;
    capturing an image of (i) the resource and (ii) the embedded content obtained from a source that differs from the content provider and rendered in the resource;
    retrieving from one or more hardware storage devices of a remote image processing system, data indicative of a specified visual element;
    comparing the captured image to the retrieved data indicative of the specified visual element without requiring a structure of the resource to be parsed as part of a verification that the specified visual element (i) is rendered in the resource with the embedded content and (ii) visually indicates that the embedded content is produced by the remote image processing system; and
    transmitting, to a server system, verification data comprising an indication of whether the specified visual element is visually presented with the embedded content, wherein transmitting the verification data consumes less bandwidth than an amount of bandwidth that would be consumed by transmitting the captured image of the resource and the embedded content rendered in the resource.

16. A non-transitory computer readable medium storing instructions that are executable by one or more processors of a client device, wherein execution of the instructions by the client device cause the client device to perform operations for verifying that embedded digital content of a rendered resource comprises a specified visual element, the operations comprising:
    embedding content in a resource provided by a content provider that configures the resource for rendering;
    rendering the embedded content;
    capturing an image of (i) the resource and (ii) the embedded content obtained from a source that differs from the content provider and rendered in the resource;
    retrieving from one or more hardware storage devices of an image processing system, data indicative of a specified visual element;
    comparing the captured image to the retrieved data indicative of the specified visual element without requiring a structure of the resource to be parsed as part of a verification that the specified visual element (i) is rendered in the resource with the embedded content and (ii) visually indicates that the embedded content is produced by the source that differs from the content provider; and transmitting, to a server system, verification data comprising an indication of whether the specified visual element is visually presented with the embedded content, wherein transmitting the verification data consumes less bandwidth than an amount of bandwidth that would be consumed by transmitting the captured image of the resource and the embedded content rendered in the resource.

* * * * *